United States Patent [19]
Shimozono et al.

[11] Patent Number: 5,835,473
[45] Date of Patent: Nov. 10, 1998

[54] OPTICAL PICK-UP, OPTICAL DATA RECORDING APPARATUS AND OBJECTIVE LENS FOR OPTICAL DATA RECORDING MATERIAL

[75] Inventors: Hiroaki Shimozono, Yokohama; Nobuyasu Ikutame, Tokyo, both of Japan

[73] Assignee: Asahi Glass Company Ltd., Tokyo, Japan

[21] Appl. No.: 782,295

[22] Filed: Jan. 15, 1997

[30] Foreign Application Priority Data

Jan. 17, 1996 [JP] Japan .................................. 8-006164

[51] Int. Cl.⁶ ...................................................... G11B 7/12
[52] U.S. Cl. .............................................. 369/112; 396/94
[58] Field of Search ..................................... 369/112, 110, 369/111, 109, 44.11, 44.14, 94, 283

[56] References Cited

U.S. PATENT DOCUMENTS

| | | | |
|---|---|---|---|
| 5,144,603 | 9/1992 | Mozume et al. | 369/112 |
| 5,559,784 | 9/1996 | Ota | 369/112 X |

FOREIGN PATENT DOCUMENTS

| | | |
|---|---|---|
| 64-25113 | 1/1989 | Japan . |
| 4-28282 | 5/1992 | Japan . |
| 7-72386 | 3/1995 | Japan . |
| 8-179195 | 7/1996 | Japan . |
| 8-334686 | 12/1996 | Japan . |

*Primary Examiner*—Muhammad N. Edun
*Attorney, Agent, or Firm*—Oblon, Spivak, McClelland, Maier & Neustadt, P.C.

[57] ABSTRACT

An optical pick-up for reading data in the data recording surface of an optical data recording material by collecting light from a light source by means of an objective lens, and shining reflection light from the data recording surface onto a light receiving element through the objective lens, the optical pick-up being adapted to read data in the data recording surface of first and second optical data recording materials wherein the thickness of a protective substrate is different from each other, wherein the objective lens is so determined that the aberration is corrected in response to the thickness of the protective substrate of the first optical data recording material, and in reading data in the data recording surface of the second optical data recording material which has a thickness different from that of the first optical data recording material, the object.image distance is adjustable so as to adjust the aberration.

29 Claims, 7 Drawing Sheets

OPTICAL PICK-UP, OPTICAL DATA RECORDING APPARATUS AND OBJECTIVE LENS FOR OPTICAL DATA RECORDING MATERIAL

BACKGROUND OF THE INVENTION

1. Field of the Invention

The present invention relates to an optical pick-up suitable for recording and reading an optical disk such as a CD (compact disk) and a DVD (digital video disk) and used for reading an optical data recording material; an optical data recording apparatus used for recording the optical data recording material, and an objective lens for the optical data recording material, which is used for the optical pick-up or the optical data recording apparatus and which has a diffraction limited performance.

2. Discussion of Background

There has been attempted to record and read a thin type optical disk for DVD having a protective substrate thickness of 0.6 mm and an optical disk for CD having a protective substrate thickness of 1.2 mm with use of a single objective lens. In this case, however, there took place aberration (spherical aberration) due to a difference between protective substrate thicknesses, thereby causing a problem that it was difficult to record and read precisely.

In order to solve such difficulty in recording and reading two kinds of optical disks whose protective substrate thicknesses are different from each other, there has been proposed a technique of replacing two objective lenses from one to the other, which were designed depending on the thicknesses, a technique of combining an objective lens with a hologram (Optical Review vol. 1, No. 1 (1994) pp. 27–29).

An example of the technique of replacing the two objective lenses is shown in FIG. 13, wherein a first objective lens 6 which is so suitably designed as to record and read an optical disk for CD 9 having a protective substrate thickness of 1.20 mm and a second objective lens 61 which is so suitably designed as to record and read an optical disk for DVD 8 having a protective substrate thickness of 0.60 mm are used, and these lenses are changed depending on an optical disk used.

An example of the technique of combining the objective lens with the hologram is shown in FIG. 14, wherein an optical disk for DVD 14 having a protective substrate thickness of 0.6 mm is recorded and read by utilizing a zero order light 12 from the hologram 10 and a refraction light from an objective lens 11, and an optical disk for CD 15 having a protective substrate thickness of 1.20 mm is recorded and read by utilizing a first order diffraction light 13 from the hologram and a refraction light from the objective lens 11.

Now, description will be made as to an objective lens for an optical data recording material.

In an optical system for an optical disk, there has been widely conducted to collect directly a laser light from a light source to the surface of an optical disk by means of a single lens. This is because a collimeter is unnecessary so that the entire structure can be simplified, and productivity can be increased.

On the other hand, there has been further increased demands of making the entire system compact and of the optical system for an optical disk of small size and reduced weight used for an optical pick-up. A single lens used for the optical system for an optical disk, which is for reducing the size and the weight, is described in publications of JP-A-64-25113 and JP-B-4-28282. Further, such single lens is also described in publications of JP-A-7-72386 and JP-A-8-179195 by the inventors of this applications.

The publication JP-A-64-25113 describes an example of an object-image distance of 15.06 mm. In this example, however, in treating an aspheric shape, since it was necessary, for a correction term on a spherical surface, to use a term in proportion to the 18th power of a height from the optical axis, the shape of the lens was so complicated that it was difficult to process the lens. Further, the above-mentioned publications concern objective lenses which are so designed as to record and read optical disks for CD and which can not record and read optical disks for DVD.

In the above-mentioned conventional technique of replacing the two objective lenses depending on the protective substrate thickness of the optical disks having different protective substrate thickness to read the two kinds of optical disks, it was difficult to obtain the alignment of optical axis accurately at the time of replacing the lenses. Further, the productivity for the optical pick-up was poor because two lenses were used.

In the conventional technique of combining the optical lens with the hologram, since it was necessary to divide the wavefront portion into two sections by utilizing a diffraction effect of the hologram, the light quantity was reduced to half or lower. Accordingly, in order to assure a requisite intensity of signal, use of a light source of high power or an increase in the sensitivity of a detector was necessary.

SUMMARY OF THE INVENTION

It is an object of the present invention to eliminate the above-mentioned disadvantages and to provide an optical pick-up which reads excellently data in optical data recording materials having different protective substrate thickness and/or refraction index by using a common and single objective lens, and an optical data recording apparatus which records excellently data in the optical data recording materials.

Further, it is an object of the present invention to provide an objective lens which is suitable for the optical pick-up and the optical data recording apparatus of the present invention and which has an excellent image formation performance and is excellent in processing because correction of aberration is possible with use of an aspheric coefficient of 6th order or lower.

In accordance with the present invention, there is provided an optical pick-up for reading data in the data recording surface of an optical data recording material by collecting light from a light source by means of an objective lens, and shining reflection light from the data recording surface onto a light receiving element through the objective lens, the optical pick-up being adapted to read data in the data recording surface of first and second optical data recording materials wherein the thickness and/or the refractive index of a protective substrate is different from each other, the optical pick-up being characterized in that the objective lens is so determined that the aberration is corrected in response to the thickness and/or the refractive index of the protective substrate of the first optical data recording material, and in reading data in the data recording surface of the second optical data recording material which has a thickness and/or a refractive index which is different from that of the first optical data recording material, the object-image distance is adjustable so as to adjust the aberration.

Further, in accordance with the present invention, there is provided an optical pick-up for reading data in the data recording surface of an optical data recording material by collecting light from a light source by means of an objective lens, and shining reflection light from the data recording surface onto a light receiving element through the objective lens, the optical pick-up being adapted to read data in the data recording surface of a plurality of optical data recording materials wherein the thickness and/or the refractive index of a protective substrate is different from each other, the optical pick-up being characterized in that in assumption of a thickness and/or a refractive index of the protective substrate of an optical data recording material for which reading is not effected, the objective lens is so determined that the aberration is corrected in response to the thickness and/or the refractive index of the protective substrate of the optical data recording material, and in reading data in plural kinds of optical data recording materials wherein the thickness and/or the refractive index of the protective substrates is different from the optical data recording material, the object-image distance is adjustable so as to adjust the aberration.

In the optical pick-up described in the above first and second inventions, the object-image distance is adjustable in a shortening direction when the thickness of the protective substrate of the optical data recording material is larger, and the distance is in a lengthening direction when the refractive index of the protective substrate of the optical data recording material is larger.

In the optical pick-up of the above first and second inventions, the object.image distance is adjustable by changing the distance between the light source and the objective lens and the distance between the objective lens and the optical data recording material.

In the optical pick-up of the above first and second inventions, the object.image distance is changed in apparent by disposing at least one optical material between the light source and the optical data recording material.

In the optical pick-up of the above first and second inventions, the wavelength of light from the light source is changed along with the change of the object.image distance in response to the thickness and/or the refractive index of the protective substrate of the optical data recording material.

According to the present invention, there is provided an optical data recording apparatus for collecting light from a light source on the data recording surface of an optical data recording material by means of an objective lens, and recording the data on a data recording surface, the apparatus being adapted to record data in the data recording surface of first and second optical data recording materials wherein the thickness and/or the refractive index of a protective substrate of the optical data recording materials is different from each other, the optical data recording apparatus being characterized in that the objective lens is so determined that the aberration is corrected in response to the thickness and/or the refractive index of the protective substrate of the first optical data recording material, and in recording data in the data recording surface of the second optical data recording material which has a thickness and/or a refractive index which is different from that of the first optical data recording material, the object.image distance is adjustable so as to adjust the aberration.

Further, in accordance with the present invention, there is provided an objective lens for an optical data recording material used for the optical pick-up or the optical data recording apparatus.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

The present invention will be described in detail with reference to the drawings.

Figure 1:
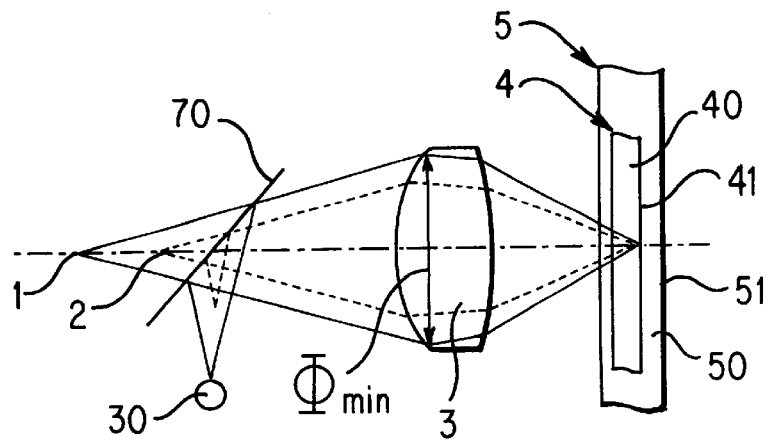
FIG. 1 is a diagram showing a typical embodiment of the optical pick-up of the present invention.

FIG. 1 is diagram showing a first embodiment of the optical pick-up of the present invention wherein reference numeral 1 designates a first position of light source, numeral 2 designates a second position of light source, numeral 3 designates an objective lens, numeral 4 designates an optical disk for DVD (having a thinner protective substrate) which is a first optical laser recording material, numeral 30 designates a light receiving element, numeral 40 designates a protective substrate for the optical disk 4 for DVD, numeral 41 designates the data recording surface (the surface of the optical disk in which data are formed) of the optical disk 4 for DVD, numeral 5 designates an optical disk (having a thicker protective substrate) which is a second optical data recording material, numeral 50 designates a protective substrate for the optical disk 5 for CD, numeral 51 designates the data recording surface of the optical disk for CD 5 and numeral 70 designates a half mirror.

In the present invention, the specifications of the objective lens are determined so that the aberration is corrected depending on, for instance, the thickness and/or the refractive index of the protective substrate 40 of the optical disk for DVD 4, and the objective lens is designed to meet the specifications.

In the case of FIG. 1, a light source is disposed at the first position of light source 1 or the second position of light source 2. When the light source is disposed at the first position 1, the optical disk for DVD 4 is read, and when the light source is disposed at the second position 2, the optical disk for CD 5 is read. The reason why the position for the light source is moved is that the objective lens which is so determined as to correct the aberration in response to the thickness and/or the refractive index of the protective substrate 40 of the optical disk for DVD 4 is used, and if the object.image distance is not changed, the aberration becomes inferior in a case of reading the optical disk for CD 5 whereby the optical disk for CD 5 can not be read.

Namely, the objective lens used for the optical system for the optical pick-up is designed so that the aberration is corrected by specifying the thickness and/or the refractive index of the protective substrate of the optical disk. Accordingly, aberration, in particular, a spherical aberration of the third order takes place depending on the thickness and/or the refractive index of the protective substrate of the optical disk when an optical disk having a thickness and/or a refractive index of the protective substrate which is different from the thickness and/or the refractive index of the protective substrate of the specified optical disk is read.

On the other hand, in a finite type optical system, when the object.image distance is changed, a spherical aberration of the third order takes place depending on a quantity of change. Accordingly, in a case of reading an optical disk having different thickness and/or refractive index of protective substrate, if the spherical aberration of the third order relying on the thickness and/or the refractive index of the protective substrate of the optical disk is suitably corrected by changing the object.image distance, it is possible to deal with an optical disk having different thickness and/or refractive index of the protective substrate by changing the optical arrangement of the objective lens.

Further, marks indicating digital signals are formed in the data recording surface of an optical disk for DVD or an optical disk for CD. When the size of 1 bit indicated by a mark is several $\mu$m or smaller, it is preferable for the objective lens to have a diffraction limited performance.

For a suitable spherical aberration of the third order to obtain accurate reading, the absolute value in the RMS value of spherical aberration of the third order is preferably 0.03 $\lambda$ or smaller, more preferably, 0.01 $\lambda$ or smaller (where $\lambda$ represents wavelength, and the optimum value of the RMS value of spherical aberration of the third order is 0). When the value is 0.03 $\lambda$ or smaller, accuracy in recording and reading is improved by more than 1% to several % in comparison with the case of more than 0.03 $\lambda$. When the value is 0.01 $\lambda$ or smaller, accuracy of recording and reading is improved by 0.5% to more than several % in comparison with the case of more than 0.03 $\lambda$.

Codes for the RMS values of spherical aberration of the third order are so determined that when a phase of a peripheral portion is ahead of a phase on the optical axis with respect to a phase of a wavefront, a positive code is used, and when the former is behind the later, a negative code is used.

In the present invention, when the object.image distance is changed, it is preferable to change the working distance (a distance from the surface of the objective lens facing an optical disk side to the surface of the optical disk facing an objective lens side) because data in the data recording surface can be read without fail by collecting light from the light source precisely on the data recording surface of the optical disk and by shining precisely reflection light from the data recording surface onto a light receiving element 30 through the objective lens.

Since the pick-up of the present invention has the above-mentioned function, it is possible to read optical disks such as DVD and CD in which the thickness and/or the refractive index of the protective substrates is different from each other.

Regarding directions of changing the object.image distance, when the thickness of the protective substrate of the optical disk is larger, the object.image distance is shortened. When the thickness of the protective substrate of the optical disk is smaller, the object.image distance is elongated. When the refractive index of the protective substrate of the optical disk is smaller, the object.image distance is shortened.

The following is examples for changing the object.image distance.

1) Means for moving only the light source (FIG. 1),
2) Means for moving only the optical disk (the working distance is also changed),
3) Means for moving both the light source and the optical disk (the working distance is also changed),
4) Means for disposing a transparent optical material between the light source and the objective lens,
5) Means for disposing a transparent optical material between the objective lens and the optical disk (the working distance is also changed),
6) Means for disposing a transparent optical material between the light source and the objective lens and disposing a transparent optical material between the objective lens and the optical disk (the working distance is also changed).

Among the means of above 1) through 6), the means 1) is preferably used since the mechanical structure is not complicated in comparison with those of the means 2) through 6) and there is less influence on the optical axis even by the movement.

In the means 4) through 6), the object.image distance is not actually changed (it is changed in apparent) because the optical path is changed by the optical material.

Further, the following is examples for changing the working distance.

a) Means for moving only the objective lens,
b) Means for moving only the optical disk,
c) Means for moving both the objective lens and the optical disk, and
d) Means for disposing a transparent optical material between the objective lens and the optical disk.

Among the means a) through d), it is preferable to use the means a) because the construction is not complicated in comparison with those of b) through d).

In the means d), the working distance is not actually changed and it is changed in apparent because the optical path is changed by the optical material. Further, when the working distance is changed, the object.image distance is also changed with it.

The transparent optical material used for changing the object.image distance and the working distance may be, for instance, a plate-like material having transparency, e.g., synthetic resin such as acryl, glass or the like, a lens, a prism or the like.

Figure 2:
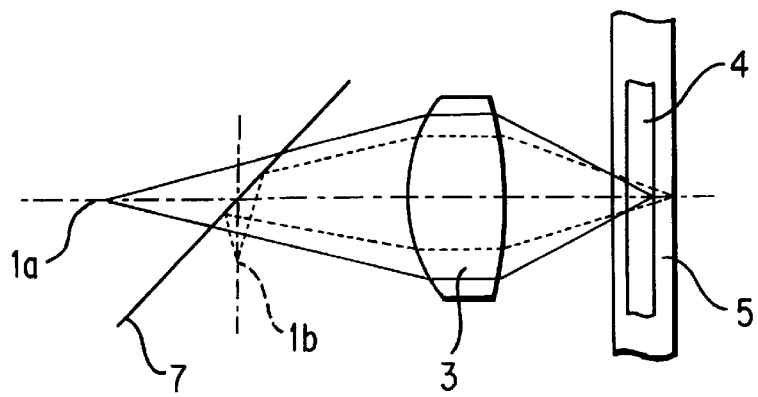
FIG. 2 is a diagram showing another embodiment of the optical pick-up of the present invention.
Figure 3:
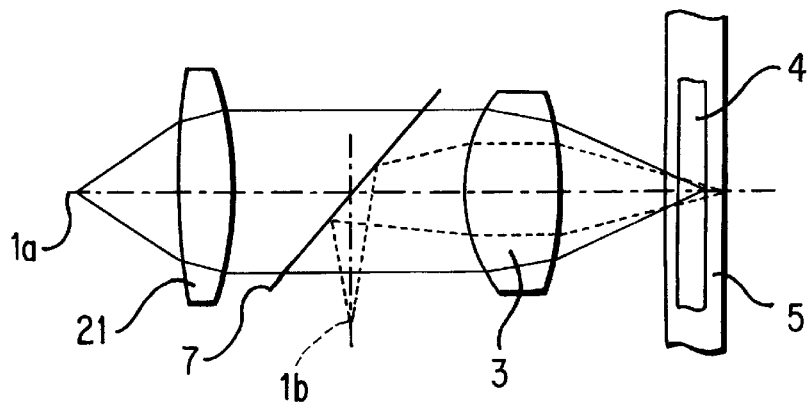
FIG. 3 is a diagram showing a separate embodiment of the optical pick-up of the present invention.

FIGS. 2 and 3 are diagrams showing respectively separate embodiments of the optical pick-up of the present invention which have different structure from that of FIG. 1, wherein two light sources are used and a transparent optical material is disposed between the light sources and an objective lens whereby the object.image distance is changed. In FIGS. 2 and 3, reference numeral 1a designates a first light source, numeral 1b designates a second light source, numeral 7 designates a half mirror, and numeral 21 designates a collimeter lens.

In FIG. 2, light from the first light source 1a is passed through the half mirror 7 to enter into the objective lens 3, and light from the second light source 1b is reflected on the half mirror 7 to enter into the objective lens 3. In FIG. 2, when the first light source 1a is used, the object.image distance is elongated in comparison with the case using the second light source 1b. However, the present invention is not limited to such structure. When the first light source 1a is used, the object.image distance may be shortened in comparison with the case of using the second light source 1b.

In FIG. 3, light from the first light source 1a is rendered to be parallel light by means of the collimeter lens 21. The parallel light is passed through the half mirror 7 to enter into the objective lens 3. Accordingly, when the first light source 1a is used, the object.image distance is infinite. Light from the second light source 1b is reflected on the half mirror 7 and enters into the objective lens 3. In this case, the object.image distance is finite.

It is not always necessary that light from the first light source 1a is rendered to be parallel light by the collimeter lens 21. When the object.image distance is formed to be finite and the collimeter lens 21 is disposed, it is enough to elongate only the object.image distance in comparison with the case that the collimeter lens 21 is not provided. In FIGS. 2 and 3, the wavelength of light from the first light source 1a may be the same as or different from the wavelength of light from the second light source 1b.

In the embodiments shown in FIGS. 1, 2 and 3, the objective lens is constituted by a single lens. However, the present invention is not limited thereto, and the objective lens may be constituted by a plurality of lenses. Further, the objective lens used is preferably of a finite type. For miniaturization of the optical pick-up, the distance between the light sources and the objective lens can be shortened and the structure can be simple.

The objective lens is not limited to a finite type but may be of an infinite type. When an infinite type objective lens is used, the distance between the objective lens and the light source is generally elongated, or a collimeter lens is arranged between the light source and the objective lens. The infinite type objective lens includes an objective lens which is designed as an infinite type and is usable as a finite type.

In FIG. 1, the half mirror 70 is disposed between the light source and the objective lens 3 so as to form a specified angle with respect to the optical axis, and reflection light from the optical disk, which is passed through the objective lens 3, is reflected on the half mirror 70 so as to shine the reflection light to the light receiving element 30.

Description has been made as to reading of two kinds of optical disks. However, the present invention is not limited to such embodiment, and the present invention is applicable to reading three or more kinds of optical disks wherein the thickness and/or the refractive index of the protective substrates are different.

In the present invention, it is preferable that a value of numerical aperture used for an optical data recording material for determining the specifications of an objective lens is equal to or larger than values of numerical aperture used for plural kinds of optical data recording materials wherein the thickness and/or the refractive index of protective substrates is different from each other. It is because accuracy in writing when data are recorded and accuracy in reading when data are reproduced are improved.

Further, referring to FIG. 1, description has been so made that the specifications of the objective lens are determined so as to correct the aberration depending on the thickness and/or the refractive index of the protective substrate 40 of the optical disk for DVD 4 and the objective lens is designed to meet the specifications.

However, the present invention is not limited to the above-mentioned description. According to the present invention, when the thickness and/or the refractive index of the protective substrate of an optical disk as an optional optical data recording material for which reading is not effected (an assumed optical disk), is assumed, the specifications of an objective lens are determined so as to correct the aberration depending on the thickness and/or the refractive index of the protective substrate of the assumed optional optical disk, and the objective lens is designed to meet the specifications. With this objective lens, an optical disk having different specifications (an optical disk having a thickness and/or a refractive index of the protective substrate which are different from the thickness and/or the refractive index of the protective substrate of the assumed optical disk) having different specifications for which reading is actually effected, may be read. It is preferable that a value of numerical aperture used for the assumed optical disk is equal to or larger than values of numerical aperture used for plural kinds of optical data recording materials wherein the thickness and/or the refractive index of protective substrates is different from each other.

For instance, on the promise of reading the optical disk 4 for DVD and the optical disk 5 for CD in which the refractive indices of the protective substrates are the same, use of an assumed optical disk having a thickness of protective substrate of 0.9 mm and the same refractive index of protective substrate as that of the protective substrate 40 of the optical disk 4 for DVD, is assumed. Then, specifications of an objective lens are determined to meet the assumed optical disk so as to correct aberration, and the objective lens is designed so as to meet the specifications.

When the optical disk 4 for DVD and the optical disk 5 for CD are read, an object.image distance which is different from that for the assumed optical disk should be set for DVD and CD to obtain a suitable aberration respectively.

A numerical aperture and a wavelength of light of a light source may be the same or different from those for the assumed optical disk, DVD and CD.

Further, in a case of recording and reading a first optical data recording material and a second optical data recording material wherein the thickness and/or the refractive index are different, when an objective lens which is determined to correct the aberration depending on the thickness and/or the refractive index of the protective substrate of the first optical data recording material is used, the aberration can be corrected by changing the object.image distance without considering a difference between the refractive index of the protective substrate of the first optical data recording material and the refractive index of the protective substrate of the second optical data recording material if the refractive index of the protective substrate of the second optical data recording material is within a range of 96.7% to 103.3% of the refractive index of the protective substrate of the first optical data recording material. Such correction of aberration is applicable to the objective lens of the present invention which is described later.

For instance, since material for the protective substrate of the optical disk is usually synthetic resin, the refractive index of the protective substrate of the optical disk is generally in a range of 1.50 to 1.60. When the aberration is corrected by changing the object.image distance, only a difference between the thickness of the protective substrate of the first optical data recording medium and the thickness of the protective substrate of the second optical data recording material should be taken into account.

Thus, when it is assumed that correction of aberration is conducted in consideration of only the thickness of the protective substrate of the optical data recording materials, the correction of aberration is effective in a case that a difference between the thickness of the protective substrate of the first optical data recording material and the thickness of the protective substrate of the second optical data recording material is ±0.1 mm or more. The correction of aberration is more effective in a case that a difference between the thickness of the protective substrate of the first optical data recording material and the thickness of the protective substrate of the second optical data recording material is ±0.3 mm or more. The correction of aberration is, in particular, effective in a case that a difference between the thickness of the protective substrate of the first optical data recording material and the thickness of the protective substrate of the second optical data recording material is ±0.5 mm or more. In these cases, it is preferable that the working distance is also properly changed.

The optical data recording material in the present invention is not limited to the optical disk for recording optical data such as an optical disk for DVD, an optical disk for CD or the like, and it may be, for instance, a tape for recording optical data.

When two or more kinds of optical data recording materials which are different from each other are to be read in the present invention, a single light source may be used while the same wavelength of light may be used for these optical data recording materials, or plural different kinds of light sources may be used while the wavelength of light may be changed for each of the optical data recording materials.

In the case that a single light source is used and the same wavelength is used to read two or more different kinds of optical data recording materials, adjustment should be made by changing the numerical aperture so as to meet the size of data portions of the optical data recording materials to be read. In brief, when the size of the data portions is large, the diameter of the light spot of the light source should be increased whereby accuracy in reading is improved.

Description will be made as to a case of using a single light source (having the same wavelength of light) for reading DVD and CD as an example. In DVD and CD, digitized signals of "0" and "1" are transformed into substantially elliptical recesses (pits) for marks. The width of a pit of CD is about 0.4 μm, and the width of a bit of DVD is generally about half as large as the width of the bit of CD.

When the width of bits of CD is read (reproduced), a laser light of a wavelength of 780 nm is generally used as the light source because a numerical aperture of 0.45 optimizes the size of the spot diameter of the laser light and it is most suitable for the best aberration.

However, since the size of the bits of DVD is smaller than the size of the bits of CD, it is necessary to increase resolution to thereby increase accuracy in reading, and therefore, it is preferable to use a light source for emitting laser having a wavelength of 615 nm–683 nm, more preferably, 635 nm–650 nm in order to read DVD. With such change of wavelength, it was found that an numerical aperture of 0.58–0.60 optimizes the size of the spot diameter of laser light to obtain the best aberration.

For instance, in attempt to use the wavelength of 635 nm–650 nm to read CD, it was found the best in a case of 0.45 (numerical aperture)·(635 nm–650 nm/780 nm)= 0.36–0.38 (numerical aperture). It is because the best aberration is obtainable by increasing the size of the spot diameter of the laser light. In consideration that for reading CD, there is an allowable range of within ±5% of the optimum numerical aperture value, (0.36–0.38 (numerical aperture))·(0.95–1.05), i.e., 0.342–0.399 (numerical aperture) is preferable. For reading CD, there is a case that a range within ±10% of the optimum numerical aperture value is allowable. For reading DVD, it is not limited to use a wavelength of 615 nm–683 nm, and a wavelength other than such range can be used.

In short, when a wavelength to be used for reading DVD is $\lambda_{DVD}$ (unit: nm) and the same wavelength of $\lambda_{DVD}$ is used for reading CD, it is preferable for reading CD to determine a numerical aperture in a range of 0.45·($\lambda_{DVD}$/780 nm)· (0.95–1.05). The above-mentioned wavelength and the numerical aperture are also usable even in a case of recording CD and DVD.

As means for changing the numerical aperture, there are a mechanical aperture and an optical aperture although the present invention is not in particular limited thereto. The mechanical aperture may be a technique of preparing a plurality of plate-like materials in which an opening having a diameter corresponding to a numerical aperture is formed and replacing these plate-like materials. The optical aperture may be such a technique that two kinds of thin optical films having wavelength selecting properties are formed on a transparent plate-like material so that a first circle having a diameter corresponding to a first numerical aperture passes a first wavelength; a second circle having a diameter corresponding to a second numerical aperture passes a second wavelength, and the first and second circles are in a relation of concentric circle.

Description has been made as to the optical pick-up of the present invention which is used for reading. It can also be used for the optical data recording apparatus of the present invention, which has basically the same construction as the optical pick-up shown in FIG. 1 to effect marking (recording) of data by shining light to optical data recording materials under the same condition as the case of reading. Further, the optical pick-up of the present invention may have functions of recording and reading together.

The optical data recording material in the present invention includes an optical data recording material having a plurality of data recording surfaces (an optical data recording material having data recording surfaces) in which the thickness of protective substrates is different from each other. Namely, it is a case that a single optical data recording material functions as a plurality of optical data recording materials. When the optical data recording material having data recording surfaces is to recorded and read, an objective lens is set to as to in agreement with the thickness of the protective substrate of the first data recording surface whereby aberration is corrected, and then, the object.image distance is changed to adjust the aberration when data in the second data recording surface are read.

In the following, description of an objective lens for an optical data recording material which is suitable for an optical pick-up and an optical data recording apparatus of the present invention will be made.

The objective lens used for the optical pick-up and the optical data recording apparatus is a single lens having a positive focal distance with a convex surface directed to a light source side and having aspheric surfaces directed to both sides of a light source and an image. The objective lens preferably satisfies the following formula (1), more preferably, the following formula (1a):

$$0.9 > 2R_1/\Phi_{min} \leq 1.1 \tag{1}$$
$$0.94 > 2R_1/\Phi_{min} \leq 1.05 \tag{1a}$$

where $R_1$: A radius of curvature at the apex in the surface facing a light source side, and ($\Phi_{min}$: A Diameter of a circle which is defined by the outermost periphery of an effective diameter in the surface facing a light source side (a position on a surface facing a light source side into which a peripheral light beam of a numerical aperture in a case of recording/reading the optical data recording material is incident) and which is included in an area perpendicular to the optical axis, when an optical data recording material having the smallest value of (thickness of protective substrate)/(refractive index of protective substrate) is recorded and read among plural kinds of optical data recording materials each having a different thickness and/or a different refractive index of the protective substrate.

The formula (1) provides conditions for correcting a spherical aberration and a coma (aberration). By satisfying the conditions of the formula (1), correction of aberration can be effected with an aspheric coefficient of lower order such as a 6th order or lower. Accordingly, the shape of the lens is prevented from complicated and it is not difficult to process the lens, hence, productivity is increased. When the value $2R_1/\Phi_{min}$ is less than 0.9, the aperture of the objective lens is increased because it is necessary to assure the thickness at the peripheral portion of the lens, which hinders miniaturization. Incidentally, $2R_1/\Phi_{min}$ means $R_1/(\Phi_{min}/2)$.

In the objective lens, the diameter of the circle which is defined by the outermost periphery of an effective diameter in the plane facing a light source side at the maximum value in a case that the numerical value at the light source side is used and which is included in an area perpendicular to the optical axis, should be 7 mm or smaller in order to contribute miniaturization, preferably 5 mm or smaller, more preferably, 3 mm or smaller.

In the present invention, when plural kinds of optical data recording materials including at least DVD are to be recorded and read, it is preferable to use of light of a wavelength of 615–683 nm as described before. In reading DVD, a numerical aperture of 0.522–0.660 is within a usable range, and a range of 0.551–0.630 is more preferable.

Further, when a finite type objective lens having a numerical aperture of 0.522–0.660 is used, a preferable range of lateral magnification is −0.14 to −0.30, and in a more preferable range, −0.14 to −0.20. Use of the lateral magnification in this range contributes miniaturization, minimizes a movement of object.image distance, and provides good productivity.

When the objective lens is used with a numerical aperture of 0.522–0.660, the objective lens should be a single lens having a positive focal distance, which has a convex surface directed to a light source side; aspheric surfaces directed to both a light source side and an image side, and satisfies the conditions of the following formula (2), and more preferably, the objective lens should satisfies the following formula (2a).

It is in particular preferable that the objective lens satisfies the following formula (2b).

$$0.126 \leq (2R_1/\Phi_{DVD}) \cdot |\beta| \leq 0.33 \tag{2}$$
$$0.1316 \leq (2R_1/\Phi_{DVD}) \cdot |\beta| \leq 0.315 \tag{2a}$$
$$0.1316 \leq (2R_1/\Phi_{DVD}) \cdot |\beta| \leq 0.21 \tag{2b}$$

where $R_1$: A radius of curvature at the apex in the surface facing a light source side, $\beta$: Lateral magnification, and $\Phi_{DVD}$: A diameter of a circle which is defined by the outermost periphery of an effective diameter in the surface facing a light source side in a case of recording and reading DVD (a position on the surface facing a light source side to which a peripheral light beam of a numerical aperture for recording and reading DVD is incident) and which is included in an area perpendicular to the optical axis, when plural kinds of optical data recording materials include at least CD and DVD.

The formula (2) shows conditions which are preferably applied when the plural kinds of optical data recording materials include at least CD and DVD, and it is more preferable to apply the formula when CD and DVD are mainly recorded and read. Reasons are as follows.

1) In an objective lens which suitably corrects a spherical aberration and a coma (aberration), design of an aspheric surface can be easy to thereby improve productivity,
2) Miniaturization is easy,
3) A sufficient thickness is obtainable at the peripheral portion of a finite type objective lens, and
4) In using a finite type objective lens, a difference between the object.image distance to CD and the object.image distance to DVD can extremely be small, and the structure of the optical pick-up or the optical data recording apparatus can be simplified.

On the premise that CD and DVD are recorded and read and when an optical data recording material other than CD and DVD is also recorded and read, it is preferable, in an aspect of the miniaturization which is described with reference to the above formula (1), to apply the formula (2) in a case that (thickness of protective substrate)/(refractive index of protective substrate) of the optical data recording material is in a range from (thickness of protective substrate)/(refractive index of protective substrate) of CD to (thickness of protective substrate)/(refractive index of protective substrate) of DVD.

Further, the objective lens used for the optical pick-up is a single lens having a positive focal distance, which has a convex surface directed to a light source side; aspheric surfaces directed to both a light source side and an image side, and satisfies conditions of the following formula (3). $\delta_1$ and $\delta_2$ in the formula (3) are respectively defined by formula (31) and formula (32).

$$(-3.5 \cdot \lambda_2/\lambda_1) \leq \delta_1, \delta_2 \leq (-1.5 \cdot \lambda_2/\lambda_1) \tag{3}$$
$$\delta_1 = (n-1)^3 A_1 f/(NA_{min})4 \tag{31}$$
$$\delta_2 = (n-1)^3 A_2 f/(NA_{min})4 \tag{32}$$

where $\lambda_1$: A wavelength usable when a value of a numerical aperture at the side of an image is the maximum in a case that recording and reading are effected to plural kinds of optical data recording materials;

$\lambda_2$: A wavelength usable when the optical data recoding materials are actually recorded and read;

n: The refractive index of the objective lens;

f: The focal distance of the objective lens;

$NA_{min}$: The minimum value of numerical aperture used at the side of an image when plural kinds of optical data recording materials are recorded and read;

$\Delta_1$: A difference of distance in the direction of the optical axis between the aspheric surface in the outermost periphery of an effective diameter in the surface facing a light source side at the time that the value of numerical aperture used at the side of an image is minimum (a position on the surface at a light source side into which a peripheral light beam of $NA_{min}$ is incident) and a reference spherical surface having a radius of curvature $R_1$ at the apex in the surface facing a light source side when recording and reading are effected to plural kinds of optical data recording materials (a positive value is given when the aspheric surface is shifted toward a light source side as portions in the aspheric surface are remoter from the optical axis): and $\Delta_2$: A difference of distance in the direction of the optical axis between the aspheric surface in the outermost area of an effective diameter in the surface facing an image side in a case that a value of numerical aperture at a side of actually used image is minimum and a reference spherical surface having a radius of curvature $R_2$ at the apex in the surface facing a light source side when recording and reading are effected to plural kinds of optical data recording materials (a positive value is given when the aspheric surface is shifted toward a light source side as portions in the aspheric surface are remoter from the optical axis).

(3) Since "$\delta_1/\delta_2$" in the formula (3) can be simplified to be "$\Delta_1/\Delta_2$", the formula (3) can be expressed as formula (3a). Accordingly, it is preferable to satisfy conditions of the formula (3a), more preferably formula (3b).

$$(-3.5 \cdot \lambda_2/\lambda_1) \leq \Delta_1/\Delta_2 \leq (-1.5 \cdot \lambda_2/\lambda_1) \quad (3a)$$

$$(-2.6 \cdot \lambda_2/\lambda_1) \leq \Delta_1/\Delta_2 \leq (-1.7 \cdot \lambda_2/\lambda_2) \quad (3b)$$

The formula (3a) shows conditions for suitably correcting a spherical aberration, in particular, when plural kinds of optical data recording material are recorded or read. In the satisfaction of the conditions of the formula (3a), the plural kinds of optical data recording materials can be recorded and read with accuracy of diffraction limit. On the other hand, when the conditions of the formula (3a) are not satisfied, it is difficult to record and read the plural kinds of optical data recording materials with accuracy of diffraction limited.

Further, according to the present invention, in a case that plural kinds of optical data recording materials including at least CD and DVD are recorded and read, the objective lens should be a single lens having a positive focal distance which has a convex surface facing a light source side and having aspheric surfaces facing both a light source side and an image side and which satisfies conditions of the following formula (4). More preferably, the objective lens satisfies conditions of the following formula (4a).

$$(-3.5 \cdot \lambda_X/\lambda_{DVD}) \leq \Delta_{1CD}/\Delta_{2CD} \leq (-1.5 \cdot \lambda_X/\lambda_{DVD}) \quad (4)$$

$$(-2.6 \cdot \lambda_X/\lambda_{DVD}) \leq \Delta_{1CD}/\Delta_{2CD} \leq (-1.7 \cdot \lambda_X/\lambda_{DVD}) \quad (4a)$$

where $\lambda_{DVD}$: A wavelength usable when DVD is recorded and read in a case that plural kinds of optical data recording materials including at least CD and DVD are recorded and read;

$\lambda_X$: A wavelength usable when an optical data recording material is actually recorded and read (a wavelength usable for CD when CD is recorded and read; a wavelength usable for DVD when DVD is recorded and read, and a wavelength usable when an optical data recording medium other than CD or DVD is recorded and read);

$\Delta_{1CD}$: A difference of distance in the direction of the optical axis between the aspheric surface in the outermost area of an effective diameter in the surface facing a light source side in a case of recording and reading CD (a position on the surface facing a light source side into which a peripheral light beam of a numerical aperture at a side of image is incident in a case of recording and reading CD) and a reference spherical surface having a radius of curvature $R_1$ at the apex of the surface at a light source side (a positive value is given when the aspheric surface is shifted toward a light source side as portions in the aspheric surface are remoter from the optical axis); and $\Delta_{2CD}$: A difference of distance in the direction of the optical axis between the aspheric surface in the outermost periphery of an effective diameter in the surface facing an image side in a case of recording and reading CD and a reference spherical surface having a radius of curvature $R_2$ at the apex of the surface facing the image side (a positive value is given when the aspheric surface is shifted toward a light source side as portions in the aspheric surface are remoter from the optical axis).

The formula (4) is similar to the formula (3) which shows conditions for correcting suitably a spherical aberration in particular and which provides desirable conditions to be applied when plural kinds of optical data recording materials include at least CD and DVD are recorded and read. In particular, the formula (4) is preferably applied when CD and DVD are recorded and read since they are recorded and read with accuracy of diffraction limited as described with reference to the formula (3a).

Further, in a case that an optical data recording material other than CD and DVD is recorded and read as well as recording and reading CD and DVD, the formulas (4) and (4a) are preferably applied when (thickness of protective substrate)/(refractive index of protective substrate) of the optical data recording material is in a range from (thickness of protective substrate)/(refractive index of protective substrate) of CD to (thickness of protective substrate)/ (refractive index of protective substrate) of DVD, whereby CD and DVD are recorded and read with accuracy of diffraction limit as described with reference to the formula (3a).

For instance, when a wavelength of 650 nm is used for recording and reading DVD and a wavelength of 780 nm is used for recording and reading CD, $(-3.5 \cdot \lambda_X/\lambda_{DVD})$ is −4.2 and $(-1.5 \cdot \lambda_X/\lambda_{DVD}))$ is −1.8 for recording and reading CD.

Now, the present invention will be described in detail with reference to Examples. However, it should be understood that the present invention is by no means restricted by such specific Examples.

[EXAMPLE]

Objective lenses having diffraction limited performance and usable optimally under conditions of a thickness of protective substrate of 0.6 mm and a refractive index of protective substrate of 1.55 in an optical disk for DVD to be recorded and read (in following Examples, it is referred to simply as DVD) were prepared. With use of the objective lenses, an optical disk for CD having a thickness of protective substrate of 1.20 mm and a refractive index of 1.55 (in the following Examples, it is referred to simply as CD) were recorded and read (EXAMPLES 1 through 7).

Table 1 shows numerical values of the objective lenses. In Table 1, f is a focal length, β is a lateral magnification, NA is a numerical aperture at the side of the optical disk (the side of an image), L is a distance from a light source to the data recording surface of the optical disk, i.e. an object.image distance, P is a working distance, d is a thickness at the center of the objective lenses, and n is a refractive index of the objective lenses.

Further, the shape of an aspheric surface is expressed by the formula (7), and each coefficient is shown in Table 1–5. In the formula (7), "j=1" represents a light source side and "j=2" represents an optical disk side. "E-1" represents $10^{-1}$ and "E-2" represents $10^{-2}$ respectively.

$$Z_j = \left( \frac{(1/r_j)h^2}{1 + \sqrt{1 - (1+k_j)(1/r_j)h^2}} \right) + a_{4,j}h^4 + a_{6,j}h^6 \quad (7)$$

where h: A height from the optical axis;

$Z_j$: A distance in the direction of the optical axis of a point on the aspheric surface at h in a j the plane (j=1 or 2) to the contact plane at the apex of the aspheric surface (a point of z of h=0), and $r_j$, $k_j$, $a_{i,j}$: Coefficients (i=4 or 6 and j=1 or 2), Unit of the distance and the height: mm.

Example 1

Figure 4:
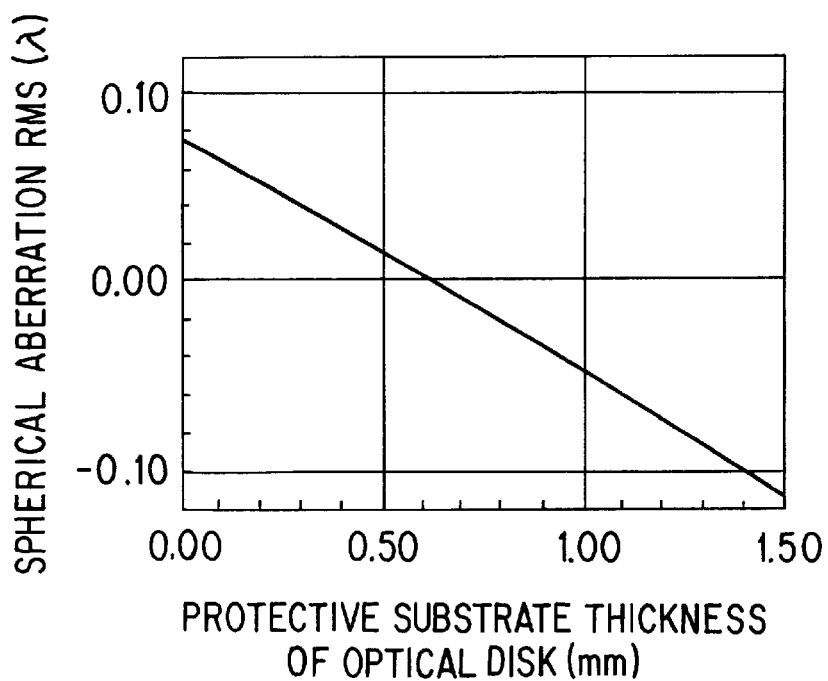
FIG. 4 is a characteristic diagram showing a relation of RMS values of the objective lens to protective substrate thicknesses of an optical disk in Example 1.

FIG. 4 in Table 1 shows aberration characteristics, which are obtained by calculation, in response to a thickness of the protective substrate of the optical disk in a case that an objective lens is adjusted to have NA of 0.38 at an optical disk side and the distance between the light source and the objective lens (the surface of the objective lens facing a light source side) is constant. In FIG. 4, the working distance is moved in response to a thickness of the protective substrate of the optical disk so that the absolute value of a RMS value of spherical aberration is minimum in calculation. Aberration characteristics shown in FIGS. 5 through 12 are obtained by calculation.

The reason why NA is determined to be 0.38 is as follows. Namely, laser having a wavelength of 780 nm is generally used as a light source in order to read CD. In this case, a value of NA of 0.45 was found to be the optimum in obtaining the optimum aberration. A light source for laser of a wavelength of 650 nm is generally used for DVD. In this case, the wavelength is short. Accordingly, it is the optimum to determine NA to be 0.38 in order that the spot size of collected light is made substantially the same as the case of using a wavelength of 780 nm.

In FIG. 4 and FIGS. 6, 8 and 11 which are described later, the abscissa represents thicknesses of the protective substrate of the optical disk and the ordinate represents resulted aberration in terms of RMS values of wavefront aberration where λ represents wavelength. In the Figures, the wavefront aberration is aberration caused due to the thicknesses of the protective substrate of the optical disk; is of a rotation symmetry with respect to the optical axis, and is a spherical aberration of the third order.

A positive code is given to a RMS value of spherical aberration when a phase at the peripheral portion is ahead of a phase on the optical axis with respect to the phase of the wavefront surface, and a negative code is given when the former is behind the later. It is understood from FIG. 4 that a spherical aberration of −0.073 λ takes place in a case that CD is recorded and read with use of the objective lens.

Figure 5:
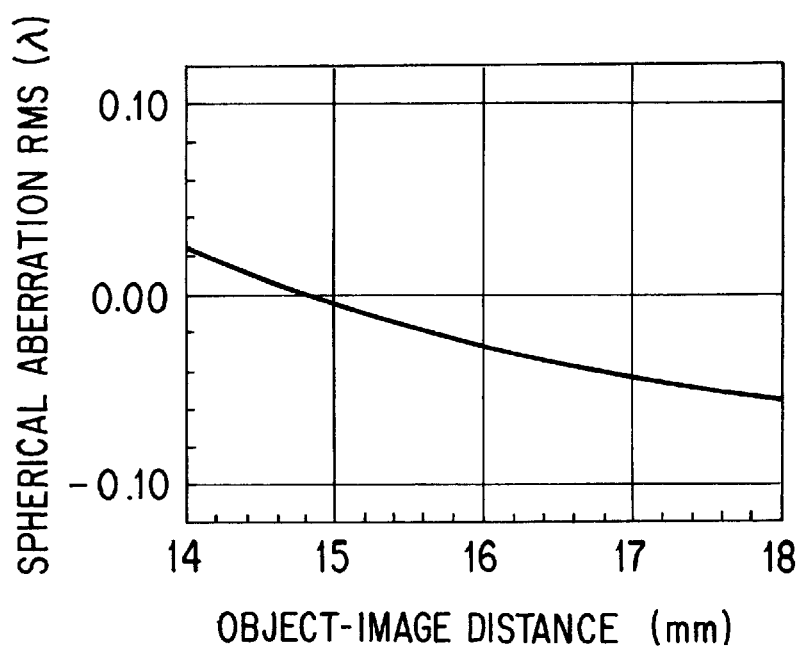
FIG. 5 is a characteristic diagram showing a relation of RMS values of spherical aberration of the objective lens to object.image distances in Example 1.

On the other hand, on the premise that the objective lens is adjusted to have NA of 0.38 to record and read CD, aberration characteristics produced when the object.image distance is changed is shown in FIG. 5. In FIG. 5 and FIGS. 7, 9, 10 and 12 which are described later, the abscissa represents object.image distance and the ordinate represents RMS values of spherical aberration. The spherical aberration is aberration caused due to a change of distance in the direction of the optical axis. The wavefront surface is in of a rotation symmetry and has a spherical aberration of the third order.

In FIG. 5, it is understood that the aberration resulted from the fact that the thickness of the protective substrate of the optical disk is different can be canceled by shortening the object.image distance. It was found through elaborate calculation that an object.image distance of 14.76 mm resulted the smallest spherical aberration (RMS value of spherical aberration=0). In this case, it was found that a working distance of 0.79 mm was preferable. In FIG. 5, the working distance is moved depending on a change of the object.image distance so that the absolute value of RMS of spherical aberration becomes the smallest in calculation.

The object.image distance was changed by moving the position of light source in the direction of the optical axis. Further, the working distance was changed by moving the objective lens in the direction of the optical axis. In Example 1, the object.image distance was determined to be 14.76 mm, and the distance between the light source and the objective lens (the surface of the objective lens facing a light source side) was determined to be 10.75 mm. The working distance was 0.79 mm.

The objective lens of the specifications described in Table 1 was prepared by injection molding plastic. It was confirmed that the aberration became optimum when the object.image distance was set to be 14.76 mm and the working distance was to be 0.79 mm.

Further, by using the objective lens, the optical pick-up as shown in FIG. 1 and an optical data recording apparatus were prepared. An optical disk for DVD and an optical disk for CD were read by using the optical pick-up, and recording was conducted by the optical data recording apparatus. As a result, faithful recording and reading were obtained to the both.

$R_1$, $\Phi_{DVD}/2$, $2R_1/\Phi_{DVD}$, $\Delta_{1CD}$, $\Delta_{2CD}$, and $\Delta_{1CD}/\Delta_{2CD}$ in Example 1 are described in Tables 6 to 8, and those are described in Examples 2 through 7 as well.

(Example 2)

Table 2 shows the specifications of the objective lens used in Example 2. In Table 2, symbols and units are the same as those in Table 1.

Figure 6:
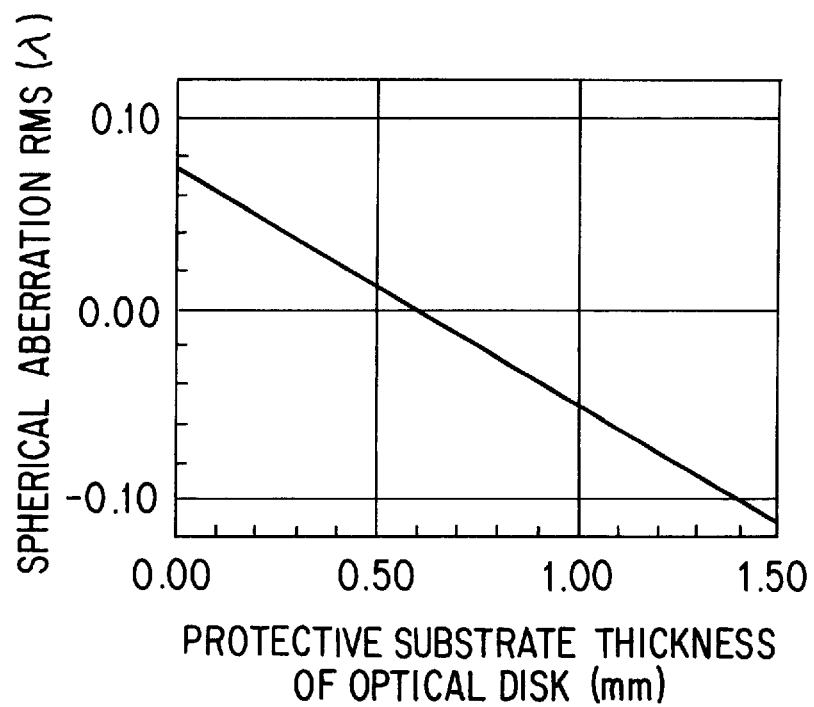
FIG. 6 is a characteristic diagram showing a relation of RMS values of spherical aberration of the objective lens to the protective substrate thicknesses of an optical disk in Example 2.

FIG. 6 shows the characteristics of the spherical aberration of the objective lens in a case that the lens is adjusted to have NA of 0.38 at an optical disk side. When the objective lens is used to record and read CD, it is found from FIG. 6 that a spherical aberration of −0.0753 λ takes place.

Figure 7:
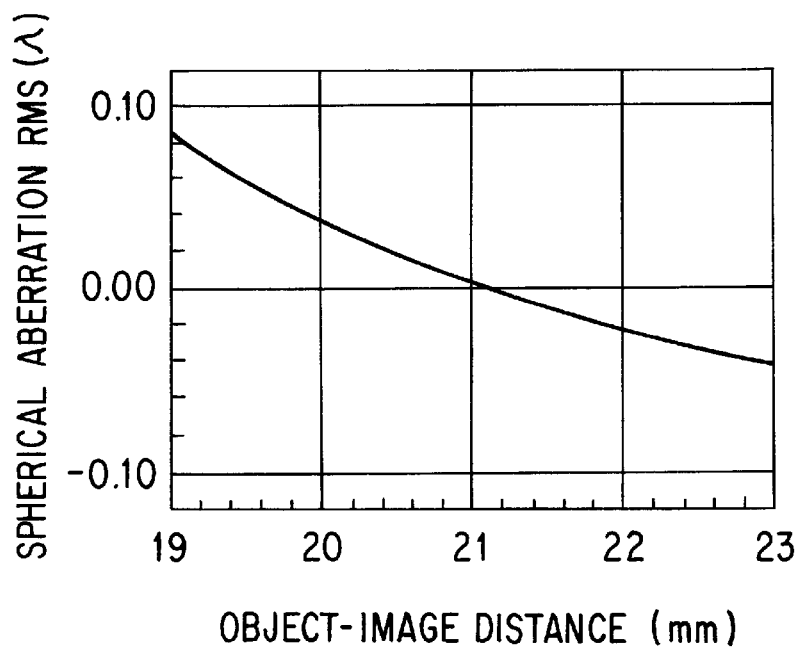
FIG. 7 is a characteristic diagram showing a relation of RMS values of spherical aberration of the objective lens to object.image distances in Example 2.

On the other hand, FIG. 7 shows the aberration characteristics resulted when the object.image distance is changed on the promise that the objective lens is adjusted to have NA of 0.38 to record and read CD. On elaborate calculation, it was found that the spherical aberration became the minimum when the object.image distance was 21.06 mm. In this case, it was found to be preferable when the working distance was 1.60 mm.

The object.image distance was changed by moving the position of light source in the direction of the optical axis. Further, the working distance was changed by moving the objective lens in the direction of the optical axis. The distance between the light source and the optical lens (the surface of the objective lens facing a light source side) was determined to be 15.36 mm. The working distance was determined to be 1.60 mm.

The objective lens as indicated in Table 2 was prepared by injection molding plastic. It was confirmed that the aberration was in the optimum condition when the object.image distance and the working distance were determined to be 21.06 mm and 1.60 mm respectively.

(Example 3)

Table 3 shows the specifications of an objective lens used in Example 3. In Table 3, symbols and units are the same as those in Table 1.

Figure 8:
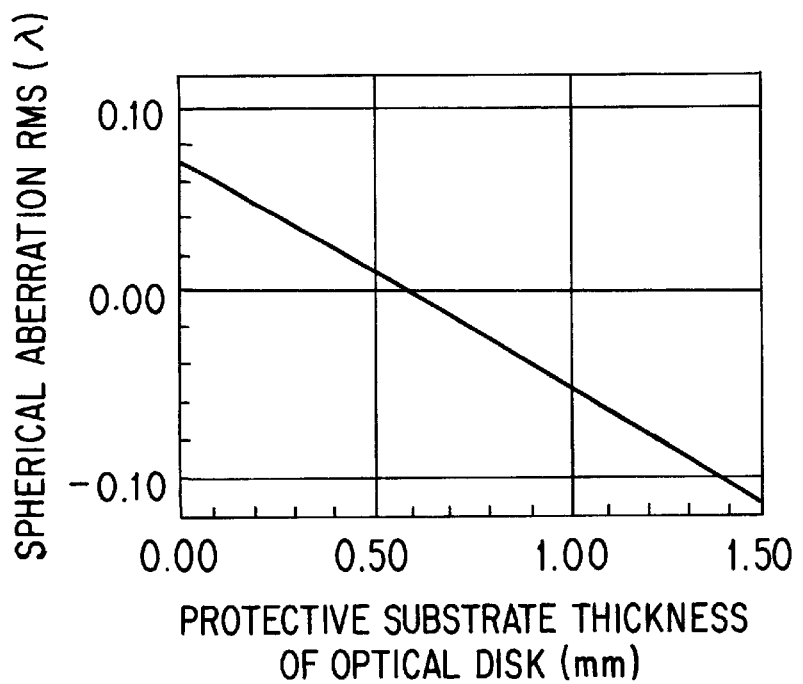
FIG. 8 is a characteristic diagram showing a relation of RMS values of spherical aberration of the objective lens to the protective substrate thicknesses of an optical disk in Example 3.

FIG. 8 shows the characteristics of the spherical aberration of the objective lens in a case that the objective lens is adjusted to have NA of 0.38 at an optical disk side. It is found from FIG. 8 that a spherical aberration of −0.0740 λ takes place in a case that CD is recorded and read with use of the objective lens.

Figure 9:
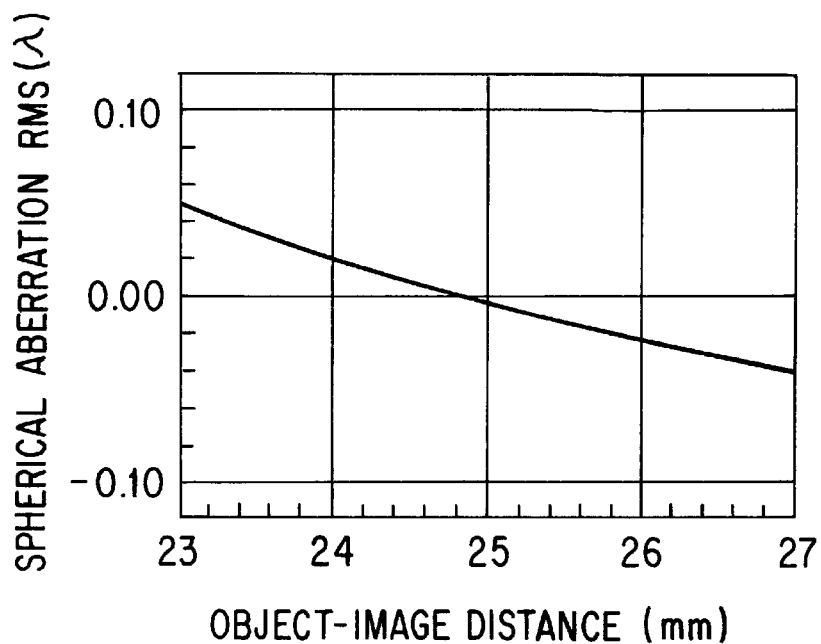
FIG. 9 is a characteristic diagram showing a relation of RMS values of spherical aberration of the objective lens to object.image distances in Example 3.

On the other hand, FIG. 9 shows the aberration characteristics resulted when the object.image distance is changed on the promise that the objective lens is adjusted to have NA of 0.38 to record and read CD. On elaborate calculation, it was found that the spherical aberration became the minimum when the object.image distance was adjusted to be 24.75 mm. In this case, it was found to be preferable when the working distance was 1.81 mm.

In Example 3, the optical pick-up shown in FIG. 2 was used, and a first light source 1a and a second light source 1b each having a wavelength of light of 650 nm were used. The change of the object.image distance was effected by switching lighting operations to the first and second light sources 1a, 1b. Further, the working distance was changed by moving the objective lens in the direction of the optical axis. The object.image distance was determined to be 24.75 mm, and the distance between the light sources and the objective lens (the surface of the objective lens at the light source side) was determined to be 18.54 mm. The working distance was 1.81 mm.

The objective lens as indicated in Table 3 was prepared by injection molding plastic. It was confirmed that the aberration was in the optimum condition when the object.image distance and the working distance were determined to be 24.75 mm and 1.81 mm respectively.

(Example 4)

The objective lens used in Example 3 was used for the optical pick-up shown in FIG. 2. The wavelength of the light of the first light source 1a was adjusted to be 650 nm and the wavelength of light of the second light source 1b was to be 780 nm. The object.image distance was determined in the same manner as in Example 3.

Figure 10:
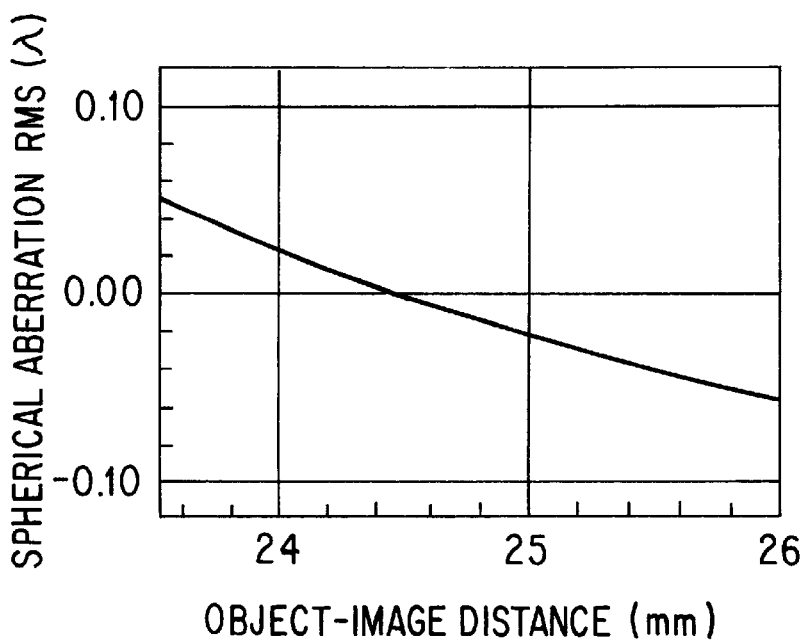
FIG. 10 is a characteristic diagram showing a relation of RMS values of spherical aberration of the objective lens to object.image distances in Example 4.

FIG. 10 shows the aberration characteristics resulted when the object.image distance is changed on the promise that the second light source 1b is used and the objective lens is adjusted to have NA of 0.45 to record and read CD. On elaborate calculation, it was found that the spherical aberration became the minimum when the object.image distance was adjusted to be 24.46 mm. In this case, it was found to be preferable when the working distance was 1.85 mm.

Further, the working distance was changed by moving the objective lens in the direction of the optical axis. The object.image distance and the distance between the light source and the objective lens (the surface of the objective lens at a light source side) were determined to be 24.46 mm and 18.21 mm respectively. The working distance was 1.85 mm.

The objective lens prepared in Example 3 was used. It was confirmed that the aberration was in the optimum condition when the object.image distance and the working distance were determined to be 24.46 mm and 1.85 mm respectively.

(Example 5)

FIG. 4 shows the specifications of an objective lens used in Example 5. In Table 4, symbols and units are the same as in Table 1.

Figure 11:
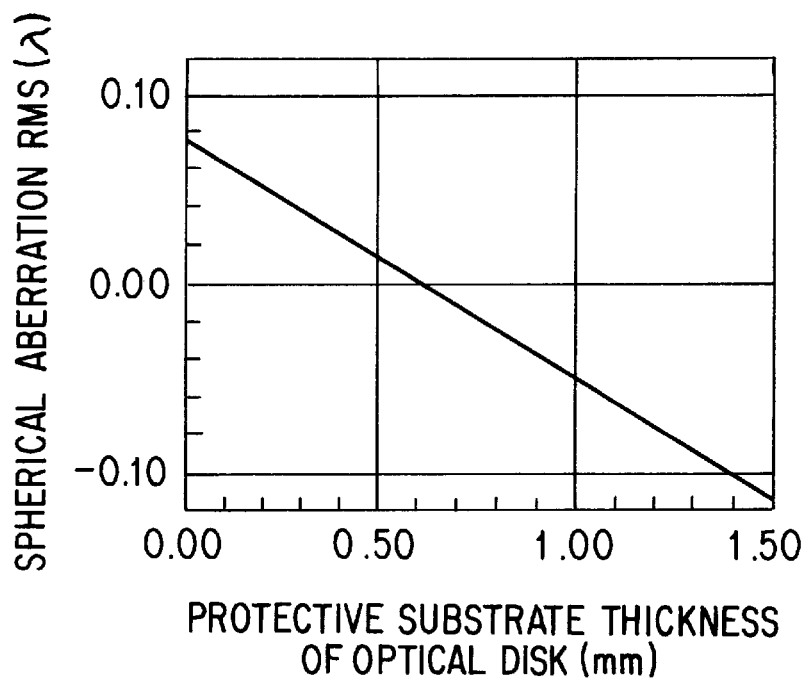
FIG. 11 is a characteristic diagram showing a relation of RMS values of spherical aberration of the objective lens to the protective substrate thicknesses of an optical disk in Example 5.

FIG. 11 shows the characteristics of the spherical aberration of the objective lens in a case that the objective lens is adjusted to have NA of 0.38 at an optical disk side. It was found from FIG. 11 that a spherical aberration of −0.0770 λ took place when CD was recorded and read with use of the objective lens.

Figure 12:
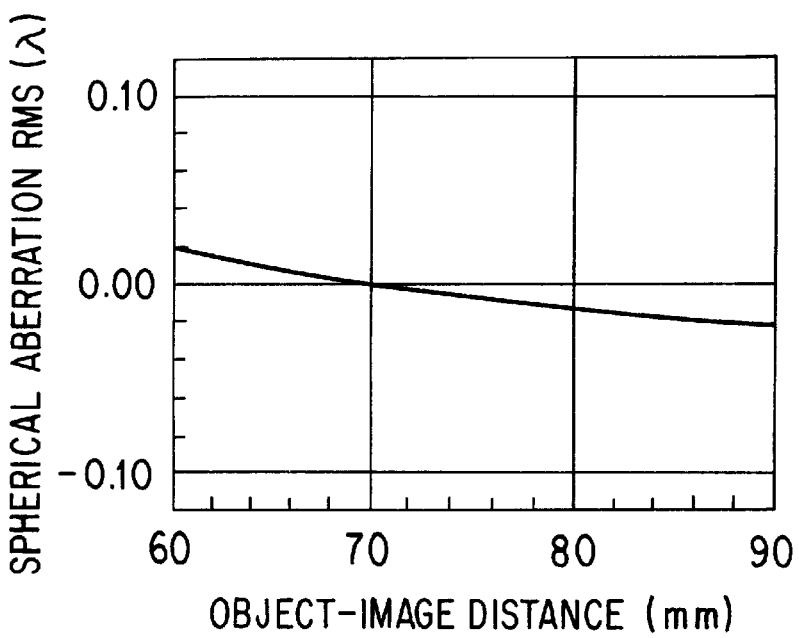
FIG. 12 is a characteristic diagram showing a relation of RMS values of spherical aberration of the objective lens to object.image distances in Example 5.
Figure 13:
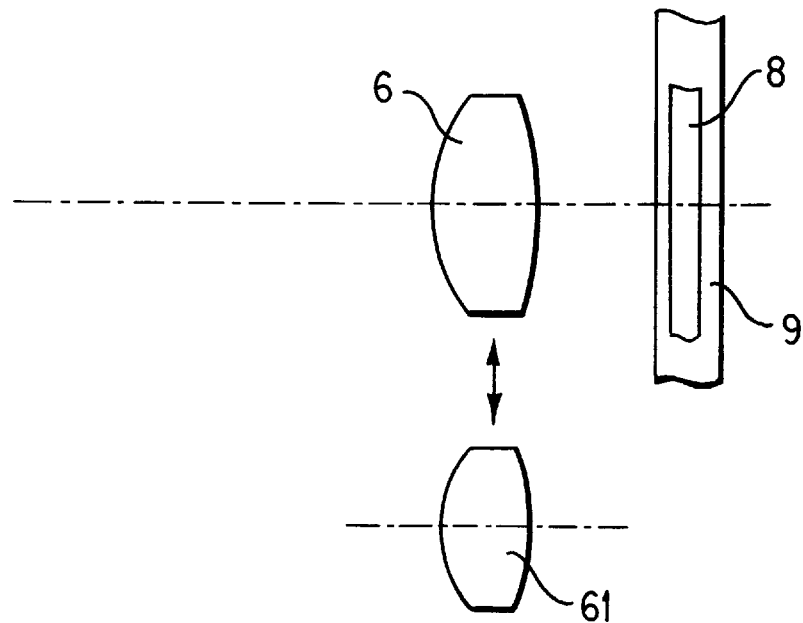
FIG. 13 is a diagram showing a conventional technique.
Figure 14:
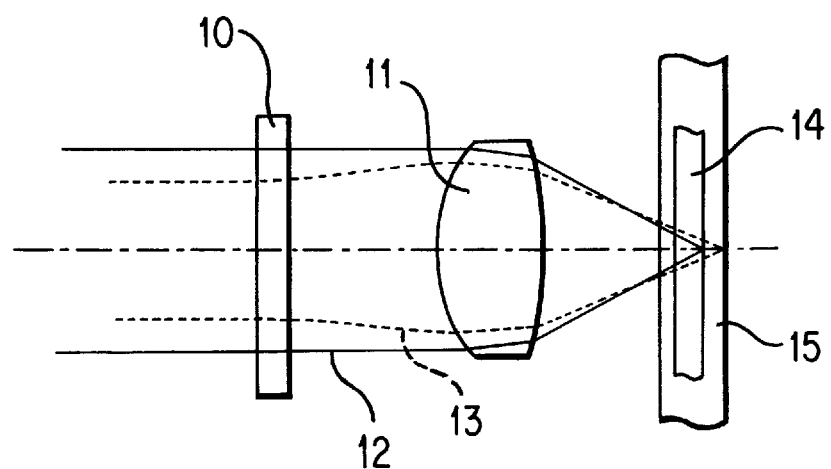
FIG. 14 is a diagram showing another example of the conventional technique.

On the other hand, FIG. 12 shows the aberration characteristics resulted when the object.image distance is changed on the promise that the objective lens is adjusted to have NA of 0.38 to record and read CD. On elaborate calculation, it was found that the spherical aberration became the minimum when the object.image distance was determined to be 70.17 mm. In this case, it was found to be preferable when the working distance was 1.37 mm.

In Example 5, the optical pick-up as shown in FIG. 3 was used. In determination of the object.image distance, the first light source 1a was for DVD and the object.image distance was set to be infinite, while for the second light source 1b, the object.image distance was adjusted to be 70.17 mm. The wavelength of lights from the first and second light sources 1a, 1b was set to be 650 nm. The change of the object.image distance was effected by switching lighting operations to the first and second light sources 1a, 1b. Also, the working distance was changed by moving the objective lens in the direction of the optical axis. The distance between the light sources and the objective lens (the surface of the objective lens at a light source side) was adjusted to be 65.00 mm. The working distance was 1.37 mm.

The objective lens indicated in Table 3 was prepared by injection molding plastic. It was confirmed that the aberration was in the optimum condition when the object.image distance was set to be infinite and the working distance was determined to be 1.37 mm.

(Example 6)

The objective lens used in Example 5 was used for the optical pick-up shown in FIG. 3. The wavelength of light of the first light source 1a was determined to be 650 nm, and the wavelength of light of the second light source was determined to be 780 nm. The object.image distance was changed in the same manner as in Example 5.

On elaborate calculation, it was found that the spherical aberration became the minimum when the object.image distance was adjusted to be 67.99 mm on the promise that the second light source 1b was used and the objective lens was adjusted to have NA of 0.45 to record and read CD. In this case, it was found to be preferable when the working distance was 1.39 mm.

The working distance was changed by moving the objective lens in the direction of the optical axis. The object.image distance and the distance between the light sources and the objective lens (the surface of the objective lens at a light source side) were set to be 67.99 mm and 62.80 mm respectively. The working distance was 1.39 mm. It was confirmed that the aberration was in the optimum condition when the objective lens prepared in Example 5 was used and the object.image distance and the working distance were set to be 67.99 mm and 1.39 mm respectively.

(Example 7)

Table 5 shows the specifications of an objective lens used in Example 7. In Table 5, symbols and units are the same as in Table 1.

The specifications of the objective lens are determined in assumption of an optical disk having a protective substrate thickness of 0.9 mm for which reading is not effected. When DVD is recorded and read without changing the distance between the objective lens and the light source, the RMS value of spherical aberration of the third order becomes 0.273 $\lambda$ in calculation. On elaborate calculation, it was found that the spherical aberration became the minimum when the object.image distance was 38.84 mm and the working distance was 1.84 mm. In this case, the distance between the light source and the objective lens (the surface of the objective lens facing a light source side) was 33.20 mm and the lateral magnification was −1/8.91.

When the objective lens was adjusted to have NA of 0.38 at an optical disk side, and CD was recorded and read without changing the distance between the objective lens and the light source, the RMS value of spherical aberration of the third order was −0.037 $\lambda$ in calculation. On elaborate calculation, it was found that the spherical aberration became minimum when the object.image distance was 26.82 mm and the working distance was 1.72 mm. In this case, the distance between the light source and the objective lens (the surface of the objective lens facing a light source side) was 20.70 mm and the lateral magnification was −1/5.28.

The objective lens as indicated in Table 5 was prepared by injection molding plastic. It was confirmed that the aberration was in the optimum condition when the specifications such as the object.image distance and so on were set in agreement with DVD and CD respectively, and DVD and CD were recorded and read.

The present invention is not limited to the numerical values described in Examples 1 through 7. In Examples 1 through 7, NA of 0.60 is set for DVD and NA of 0.38 or 0.45 is set for CD. However, the present invention is applicable to record and read optical disks whose thickness and/or refractive index of the protective substrates are different from each other even in a case of setting a different values of NA if a finite type objective lens is used and the object.image distance is changed.

TABLE 1

| | |
|---|---|
| f = 2.10 mm | $r_1$ = 1.4404 |
| $\beta$ = −1/7.01 | $r_2$ = −2.3869 |
| NA = 0.60 | $k_1$ = −0.635440 |
| L = 19.85 mm | $k_2$ = −13.603118 |
| p = 1.00 mm | $a_{4.1}$ = −7.890765E-4 |
| d = 2.02 mm | $a_{4.2}$ = 7.598318E-3 |
| n = 1.522 | $a_{6.1}$ = −1.386583E-3 |

TABLE 1-continued

| | |
|---|---|
| | $a_{6.2}$ = −5.882977E-4 |
| Wavelength ($\lambda$) = 650 nm | |
| Calculation result (RMS value of wavefront aberration in total) | 0.004 $\lambda$ |
| Calculation result (RMS value of spherical aberration of the third order) | 0.000 |

TABLE 2

| | |
|---|---|
| f = 3.10 mm | $r_1$ = 2.11985 |
| $\beta$ = −1/5.72 | $r_2$ = −3.62924 |
| NA = 0.60 | $k_1$ = −0.639120 |
| L = 25.28 mm | $k_2$ = −12.037762 |
| P = 1.80 mm | $a_{4.1}$ = −1.212973E-3 |
| d = 2.90 mm | $a_{4.2}$ = 2.382792E-3 |
| n = 1.522 | $a_{6.1}$ = −1.890671E-4 |
| | $a_{6.2}$ = −6.779464E-5 |
| Wavelength ($\lambda$) = 650 nm | |
| Calculation result (RMS value of wavefront aberration in total) | 0.002 $\lambda$ |
| Calculation result (RMS value of spherical aberration of the third order) | 0.000 |

TABLE 3

| | |
|---|---|
| f = 3.45 mm | $r_1$ = 2.34666 |
| $\beta$ = −1/6.26 | $r_2$ = −4.12994 |
| NA = 0.60 | $k_1$ = −0.621896 |
| L = 29.94 mm | $k_2$ = −13.549945 |
| P = 2.00 mm | $a_{4.1}$ = −7.133208E-4 |
| d = 3.20 mm | $a_{4.2}$ = 1.696367E-3 |
| n = 1.522 | $a_{6.1}$ = −1.286175E-4 |
| | $a_{6.2}$ = −2.969750E-5 |
| Wavelength ($\lambda$) = 650 nm | |
| Calculation result (RMS value of wavefront aberration in total) | 0.002 $\lambda$ |
| Calculation result (RMS value of spherical aberration of the third order) | 0.000 |

TABLE 4

| | |
|---|---|
| f = 3.39 mm | $r_1$ = 2.10926 |
| $\beta$ = 0 | $r_2$ = −6.30064 |
| NA = 0.60 | $k_1$ = −0.511527 |
| L = $\infty$ | $k_2$ = −45.548177 |
| P = 1.57 mm | $a_{4.1}$ = +4.899411E-4 |
| d = 2.60 mm | $a_{4.2}$ = 3.571194E-3 |
| n = 1.522 | a6.1 = −9.780337E-5 |
| | $a_{6.2}$ = −1.638704E-4 |
| Wavelength ($\lambda$) = 650 nm | |
| Calculation result (RMS value of wavefront aberration in total) | 0.002 $\lambda$ |
| Calculation result (RMS value of spherical aberration of the third order) | 0.000 |

TABLE 5

| | |
|---|---|
| f = 3.44 mm | $r_1$ = 2.36140 |
| $\beta$ = −1/6.28 | $r_2$ = −4.03254 |
| NA = 0.60 | $k_1$ = −0.611482 |
| L = 30.06 | $k_2$ = −12.747749 |
| P = 1.81 mm | $a_{4.1}$ = −7.624724E-4 |
| d = 3.20 mm | $a_{4.2}$ = 1.694423E-3 |
| n = 1.522 | $a_{6.1}$ = −1.330437E-4 |
| | $a_{6.2}$ = −2.371494E-5 |
| Wavelength ($\lambda$) = 650 nm | |

TABLE 5-continued

| | |
|---|---|
| Calculation result (RMS value of wavefront aberration in total) | 0.001 λ |
| Calculation result (RMS value of spherical aberration of the third order) | 0.000 |

TABLE 6

| | $R_1$ (mm) | $\Phi_{DVD}/2$ (mm) | $2R_1/\Phi_{DVD}$ | Thickness of peripheral portion of lens in $\Phi_{DVD}$ (mm) |
|---|---|---|---|---|
| Example 1 | 1.44044 | 1.4550 | 0.990 | 0.983 |
| Example 2 | 2.11985 | 2.2285 | 0.951 | 1.264 |
| Example 3 | 2.34666 | 2.4482 | 0.959 | 1.424 |
| Example 5 | 2.10926 | 2.0321 | 1.038 | 1.331 |
| example 7 | 2.36140 | 2.2358 | 1.056 | 1.601 |

TABLE 7

| | $\Delta_{1CD}$ (mm) | $\Delta_{2CD}$ (mm) |
|---|---|---|
| Example 1 | 0.03350 | −0.01864 |
| Example 2 | 0.05667 | −0.02713 |
| Example 3 | 0.05809 | −0.02799 |
| Example 4 | 0.15884 | −0.06473 |
| Example 5 | 0.03226 | −0.01253 |
| Example 6 | 0.08353 | −0.02762 |
| Example 7 | 0.04546 | −0.02282 |

TABLE 8

| | $\Delta_{1CD}/\Delta_{2CD}$ (NA 0.38) | $\Delta_{1CD}/\Delta_{2CD}$ (NA 0.45) |
|---|---|---|
| Example 1 | −1.797 | — |
| Example 2 | −2.089 | — |
| Example 3 | −2.075 | — |
| Example 4 | — | −2.454 |
| Example 5 | −2.575 | — |
| Example 6 | — | −3.024 |
| Example 7 | −1.992 | — |

In the present invention, since a single objective lens is used to record and read plural kinds of optical data recording materials which have a different thickness and/or a different refractive index of the protective substrate, the structure of an optical pick-up is simplified, and therefore, productivity is improved. Further, miniaturization, weight reduction and preciseness can be achieved in the optical pick-up. Further, in a structure wherein an optical material such as a hologram or the like is not disposed in the optical path, a loss of light quantity from the light source can be reduced, and electric power for the light source and the detector can be saved.

An objective lens prepared in accordance with the present invention can correct desirably a spherical aberration and a coma aberration. Further, correction of aberration can be effected with an aspheric coefficient of lower order such as a 6th order or lower. Accordingly, the shape of the lens is prevented from complicated, and accordingly, processing is not so difficult and productivity is improved. Further, the thickness of the objective lens near the peripheral portion is assured, and miniaturization is easy.

Now, the present invention will be described in further detail with reference to Examples. However, it should be understood that the present invention is by no means restricted to such specific Examples.

What is claimed is:

1. An optical pick-up for reading data in a data recording surface of an optical data recording material by collecting light from a light source by means of an objective lens, and shining reflection light from the data recording surface onto a light receiving element through the objective lens, said optical pick-up being adapted to read data in the data recording surface of first and second optical data recording materials wherein at least one of a thickness and a refractive index of a first protective substrate of the first material is different from a respective at least one of a thickness and refractive index of a second protective substrate of the second material, said optical pick-up being characterized in that:
the objective lens is so determined that an aberration is corrected in response to one of the first thickness and the first refractive index of the protective substrate of the first optical data recording material, and in reading data in the data recording surface of the second optical data recording material which has at least one of said thickness and said refractive index which is different from a respective one of said thickness and said refractive index of the first optical data recording material, an object.image distance being adjustable so as to adjust an aberration.

2. The optical pick-up according to claim 1, wherein the object.image distance is adjustable in a shortening direction when the thickness of the protective substrate of the optical data recording material is larger, and the distance is in a lengthening direction when the refractive index of the protective substrate of the optical data recording material is larger.

3. The optical pick-up according to claim 1, wherein the object.image distance is adjustable by changing the distance between the light source and the objective lens and the distance between the objective lens and the optical data recording material.

4. The optical pick-up according to claim 1, wherein the object.image distance is changed in apparent by disposing at least one optical material between the light source and the optical data recording material.

5. The optical pick-up according to claim 1, wherein the wavelength of light from the light source is changed along with the change of the object.image distance in response to the thickness and/or the refractive index of the protective substrate of the optical data recording material.

6. The optical pick-up according to claim 1, wherein a value of numerical aperture used for the first optical data recording material is equal to or larger than values of numerical aperture used for plural kinds of optical data recording materials wherein the thickness and/or the refractive index of protective substrates is different from each other.

7. The optical pick-up according to claim 1, wherein the first and second optical data recording materials whose thickness of protective substrates is different from each other constitute a single optical data recording material having plural data recording surfaces.

8. The optical pick-up according to claim 1, wherein in reading data in the data recording surface of the first optical data recording material, the objective lens is so determined that the absolute value of an RMS value of spherical aberration of the third order is 0.03 λ or less, wherein λ represents a wavelength of light from the light source and that of the off-axis coma aberration is substantially minimum.

9. An optical pick-up for reading data in the data recording surface of an optical data recording material by collecting light from a light source by means of an objective lens, and shining reflection light from the data recording surface onto a light receiving element through the objective lens, said optical pick-up being adapted to read data in the data recording surface of a plurality of optical data recording material wherein at least one of a thickness and a refractive index of a protective substrate is different for each one of said plurality of optical data recording materials, said optical pick-up being characterized in that:

for a predetermined thickness and refractive index of the protective substrate of an optical data recording material for which reading is not effected, the objective lens is constructed so that an aberration is corrected in response to a change in at least one of the thickness and the refractive index of the protective substrate of the optical data recording material, and in reading data in each of said plurality of optical data recording materials wherein at least one of the thickness and the refractive index of the protective substrates is different from said optical data recording material for which reading is not effected, the object.image distance being adjustable so as to adjust the aberration.

10. The optical pick-up according to claim 9, wherein the object.image distance is adjustable in a shortening direction when the thickness of the protective substrate of the optical data recording material is larger, and the distance is in a lengthening direction when the refractive index of the protective substrate of the optical data recording material is larger.

11. The optical pick-up according to claim 9, wherein the object.image distance is adjustable by changing the distance between the light source and the objective lens and the distance between the objective lens and the optical data recording material.

12. The optical pick-up according to claim 9, wherein the object.image distance is changed in apparent by disposing at least one optical material between the light source and the optical data recording material.

13. The optical pick-up according to claim 9, wherein the wavelength of light from the light source is changed along with the change of the object.image distance in response to the thickness and/or the refractive index of the protective substrate of the optical data recording material.

14. The optical pick-up according to claim 9, wherein a value of numerical aperture used for an assumed optical data recording material for which reading is not effected is equal to or larger than a value of numerical aperture used for plural kinds of optical data recording materials wherein the thickness and the refractive index of protective substrates is different from each other.

15. An optical data recording apparatus for collecting light from a light source on the data recording surface of an optical data recording material by means of an objective lens, and recording the data on a data recording surface, said apparatus being adapted to record data in the data recording surface of first and second optical data recording materials wherein at least one of a thickness and a refractive index of a protective substrate of the first optical data recording material is different from a respective at least one of a thickness and a refractive index of a protective substrate of the second data recording material, said optical data recording apparatus being characterized in that:

the objective lens is so determined that the aberration is corrected in response to at least one of the thickness and the refractive index of the protective substrate of the first optical data recording material, and in recording data in the data recording surface of the second optical data recording material which has at least one of the thickness and the refractive index which is different from that of the first optical data recording material, the object image distance is adjustable so as to adjust the aberration.

16. The optical data recording apparatus according to claim 15, wherein the object.image distance is adjustable in a shortening direction when the thickness of the protective substrate of the optical data recording material is larger, and the distance is in a lengthening direction when the refractive index of the protective substrate of the optical data recording material is larger.

17. The optical data recording apparatus according to claim 15, wherein the object.image distance is adjustable by changing the distance between the light source and the objective lens and the distance between the objective lens and the optical data recording material.

18. The optical data recording apparatus according to claim 15, wherein the object.image distance is changed in apparent by disposing at least one optical material between the light source and the optical data recording material.

19. The optical data recording apparatus according to claim 15, wherein the wavelength of light from the light source is changed along with the change of the object.image distance in response to the thickness and/or the refractive index of the protective substrate of the optical data recording material.

20. An objective lens for an optical data recording material characterized in that:

the objective lens is a single lens having a positive focal length, a convex surface which is directed to a light source side and aspheric surfaces directed to both sides of a light source and an image, and the objective lens satisfies the formula (2) described below:

$$0.126 \leq (2R_1/\Phi_{DVD}) \cdot |\beta| \leq 0.33 \tag{2}$$

where:

$R_1$: The radius of curvature at the apex in the surface facing a light source side;

$\beta$: Lateral magnification, and $\Phi_{DVD}$: The diameter of a circle which is defined by the outermost periphery of an effective diameter in the surface facing a light source side in a case of recording and reading DVD, and is included in an area perpendicular to the optical axis, when plural kinds of optical data recording materials, in which the protective substrates have at least one of different thicknesses and different refractive indexes and include CD and DVD.

21. An objective lens for an optical data recording material characterized in that:

the objective lens is a single lens having a positive focal length; a convex surface which is directed to a light source side, and aspherical surfaces directed to both sides of a light source and an image, and the objective lens satisfies the formula (3a) described below:

$$(-3.5 \cdot \lambda_2/\lambda_1) \leq \Delta_1/\Delta_2 \leq (-1.5 \cdot \lambda_1) \tag{3a}$$

where:

$\lambda_1$: A wavelength usable when a value of numerical aperture at the side of an actually used image is the maximum in a case that recording or reading is effected to plural kinds of optical data recording materials wherein at least one of a thickness and a refractive index of the protective substrate is different for each one of said recording materials;

$\lambda_2$: A wavelength usable when the optical data recording materials are actually recorded or read;

$\Delta_1$: A difference of distance in the direction of the optical axis between an aspheric surface in the outermost area of an effective diameter in a surface in the outermost area of an effective diameter in a surface facing a light source side in a case that a value of numerical aperture at the side of an actually used image is minimum and a reference spherical surface having a radius of curvature at the apex in a surface facing a light source side when recording or reading is effected to plural kinds of optical data recording materials wherein at least one of a thickness and a refractive index of the protective substrate is different for each of said recording materials, and $\Delta_2$: A difference of distance in the direction of the optical axis between an aspheric surface in the outermost area of an effective diameter in a surface facing an image side in a case that a value of numerical aperture at the side of an actually used image is minimum and a reference spherical surface having a radius of curvature at the apex in a surface facing a light source side when recording or reading is effected to plural kinds of optical data recording materials (a positive value is given when the aspheric surface is shifted toward a light source side as portions in the aspheric surface are remoter from the optical axis.

22. An optical pick-up for recording or reading data in the data recording surface of an optical data recording material by collecting light from a light source by means of an objective lens, and shining reflection light from the data recording surface onto a light receiving element through the objective lens, and optical pick-up being adapted to record or read data in the data recording surface of first and second optical data recording materials wherein at least one of a thickness and refractive index of a protective substrate is different for each of said first and second data recording materials, said optical pick-up being characterized in that:

in a change of the object.image distance depending on a difference between one of the thickness and the refractive index of the protective substrate of the first optical data recording material and one of the thickness and the refractive index of the protective substrate of the second optical data recording material, provided that $t_1<t_2$, where $t_1$ indicates the thickness of the protective substrate of the first optical data recording material, and $t_2$ indicates the thickness of the protective substrate of the second optical data recording material, $\beta_1>\beta_2$ where $\beta_1$ indicates the lateral magnification of the optical pick-up from the light source to the data recording surface of the first optical data recording material when recording or reading is effected to the thickness $t_1$ of the protective substrate of the first optical data recording material, and $\beta_2$ indicates the lateral magnification of the optical pick-up from the light source to the data recording surface of the second optical data recording material when recording or reading is effected to the thickness $t_2$ of the protective substrate of the second optical data recording material.

23. The optical pick-up according to claim 22, wherein the object.image distance is changed in apparent by disposing at least one optical material between the light source and the first optical data recording material or between the light source and the second optical data recording material.

24. The optical pick-up according to claim 22, wherein the wavelength of the light from the light source is changed along with the change of the object.image distance.

25. The optical pick-up according to claim 22, wherein two light sources are provided to change the object.image distance, and when there is a relation of $L_1>L_2$ wherein $L_1$ indicates a distance between the first light source and the data recording surface of the first optical data recording material and $L_2$ indicates a distance between the second light source and the data recording surface of the second optical data recording material, the first light source is used in a case that the object.image distance is to be longer while the second light source is used in a case that the object.image distance is longer.

26. An optical pick-up for recording or reading data in the data recording surface of an optical data recording material by collecting light from a light source by means of an objective lens, and shining reflection light from the data recording surface onto a light receiving element through the objective lens, and optical pick-up being adapted to record or read data in the data recording surface of first and second optical data recording materials wherein at least one of a thickness and refractive index of a protective substrate is different for each of said first and second data recording materials, said optical pick-up being characterized in that:

in a change of the object.image distance depending on a difference between one of the thickness and the refractive index of the protective substrate of the first optical data recording material and one of the thickness and the refractive index of the protective substrate of the second optical data recording material, provided that $t_1<t_2$, where $t_1$ indicates the thickness of the protective substrate of the first optical data recording material, and $t_2$ indicates the thickness of the protective substrate of the second optical data recording material, $\beta_1>\beta_2$ where $\beta_1$ indicates the lateral magnification of the optical pick-up from the light source to the data recording surface of the first optical data recording material when recording or reading is effected to the thickness $t_1$ of the protective substrate of the first optical data recording material, and $\beta_2$ indicates the lateral magnification of the optical pick-up from the light source to the data recording surface of the second optical data recording material when recording or reading is effected to the thickness $t_2$ of the protective substrate.

27. The optical pick-up according to claim 26, wherein the object.image distance is changed in apparent by disposing at least one optical material between the light source and the optical data recording material.

28. The optical pick-up according to claim 26, wherein the wavelength of light from the light source is changed along with the change of the object.image distance.

29. The optical pick-up according to claim 26, wherein two light sources are provided to change the object.image distance, and when there is a relation of $L_1>L_2$ wherein $L_1$ indicates a distance between the first light source and the first data recording surface, and $L_2$ indicates a distance between the second light source and the second data recording surface, the first light source is used in a case that the object.image distance is to be longer while the second light source is used in a case that the object.image distance is to be shorter.

* * * * *